(12) United States Patent
Guillemette et al.

(10) Patent No.: US 7,690,908 B2
(45) Date of Patent: Apr. 6, 2010

(54) METHOD AND APPARATUS FOR FORMING HIGH STRENGTH PRODUCTS

(75) Inventors: Richard Guillemette, West Warwick, RI (US); Glen Guillemette, Narragansett, RI (US); Roger Guillemette, Narragansett, RI (US)

(73) Assignee: Guill Tool & Engineering Co., Inc., West Warwick, RI (US)

( * ) Notice: Subject to any disclaimer, the term of this patent is extended or adjusted under 35 U.S.C. 154(b) by 241 days.

(21) Appl. No.: 12/082,345

(22) Filed: May 31, 2007

(65) Prior Publication Data

US 2008/0315449 A1    Dec. 25, 2008

Related U.S. Application Data

(60) Provisional application No. 60/809,697, filed on May 31, 2006.

(51) Int. Cl.
*B29C 47/06* (2006.01)
*B32B 1/00* (2006.01)

(52) U.S. Cl. ............... 425/133.5; 264/176.1; 264/171; 425/133.1; 425/131.1; 425/463

(58) Field of Classification Search .............. 425/131.1, 425/133.1, 133.5, 463; 264/176.1, 171
See application file for complete search history.

(56) References Cited

U.S. PATENT DOCUMENTS

| 4,152,387 | A  | * | 5/1979 | Cloeren ................. 264/173.13 |
| 5,094,788 | A  | * | 3/1992 | Schrenk et al. ......... 264/173.15 |
| 5,667,818 | A  | * | 9/1997 | Guillemette ............. 425/133.1 |
| 6,692,804 | B1 | * | 2/2004 | Guillemette et al. ....... 428/36.9 |
| 7,001,547 | B2 | * | 2/2006 | Rasmussen ................ 264/40.7 |
| 2001/0007683 | A1 | * | 7/2001 | Cree ....................... 425/133.1 |
| 2003/0127765 | A1 | * | 7/2003 | Weiland et al. ................ 264/69 |

* cited by examiner

*Primary Examiner*—Joseph S Del Sole
*Assistant Examiner*—Nahida Sultana
(74) *Attorney, Agent, or Firm*—Perman & Green LLP

(57) ABSTRACT

A system and method are presented in which a flow of plastic is extruded to obtain nano-sized features by forming multiple laminated flow streams, flowing in parallel through the system. Each of the parallel laminated flow streams are subjected to repeated steps in which the flows are divided, and overlapped to amplify the number of laminations. The parallel amplified laminated flows are rejoined to form a cumulated laminated output with nano-sized features.

13 Claims, 5 Drawing Sheets

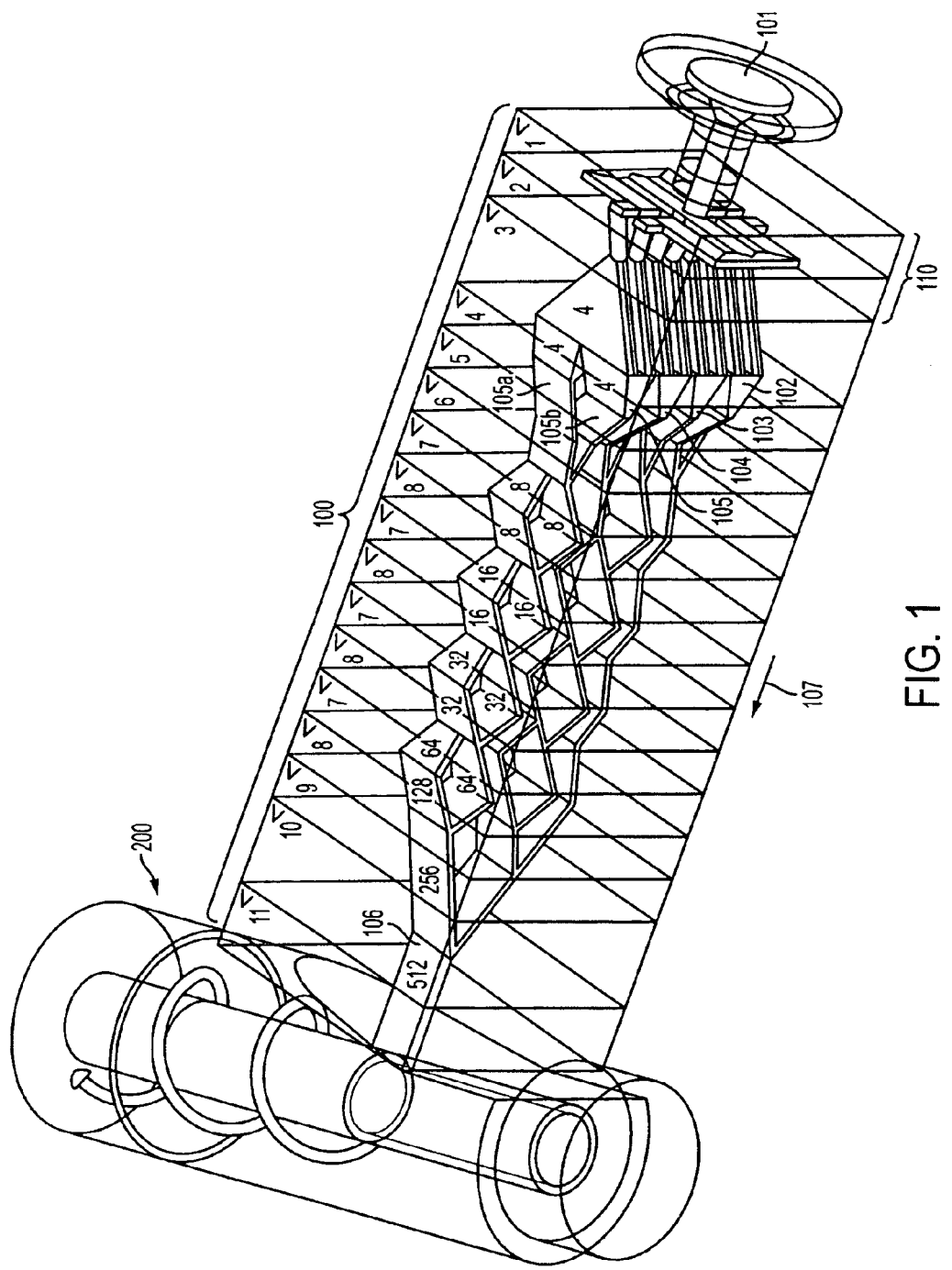

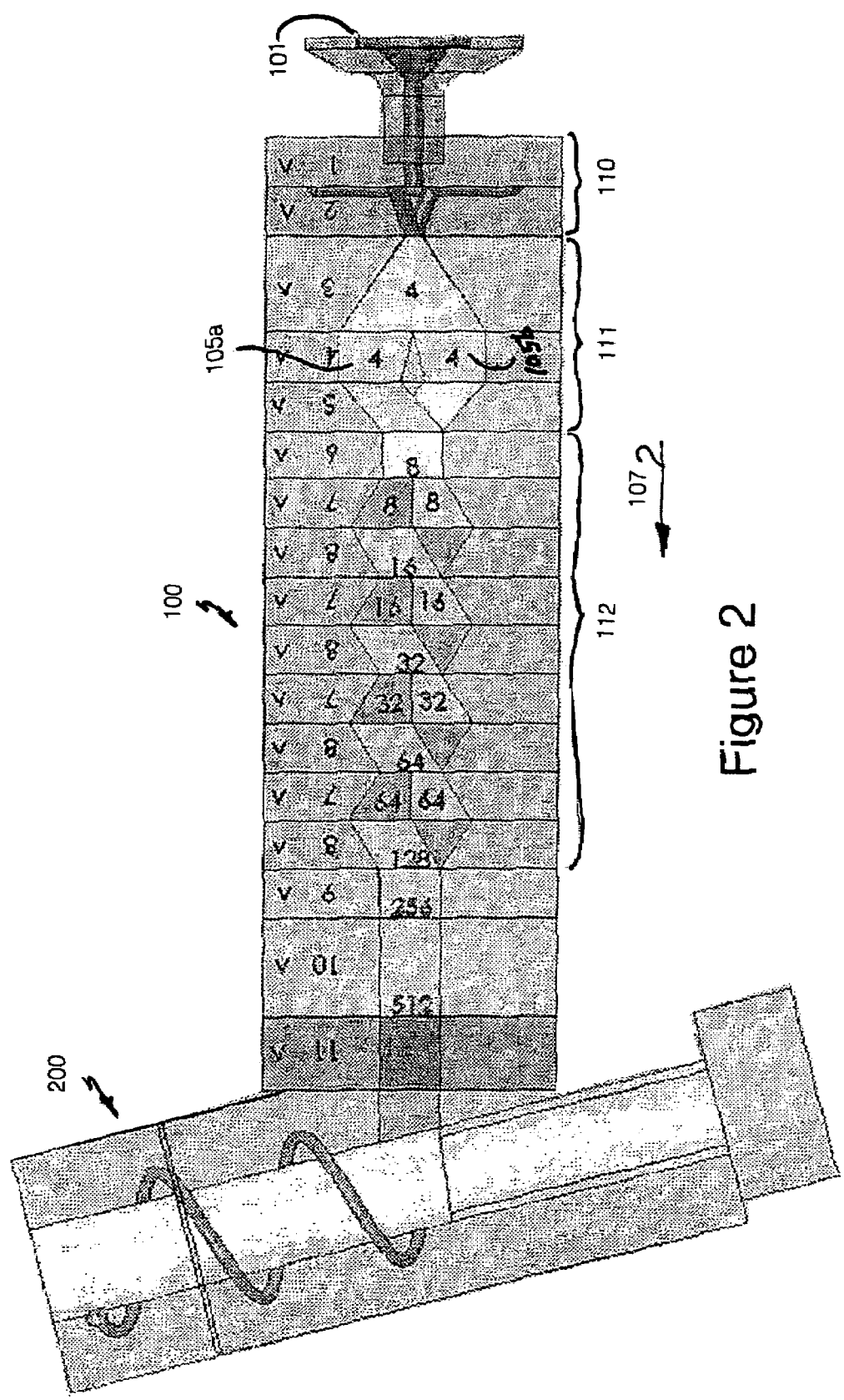

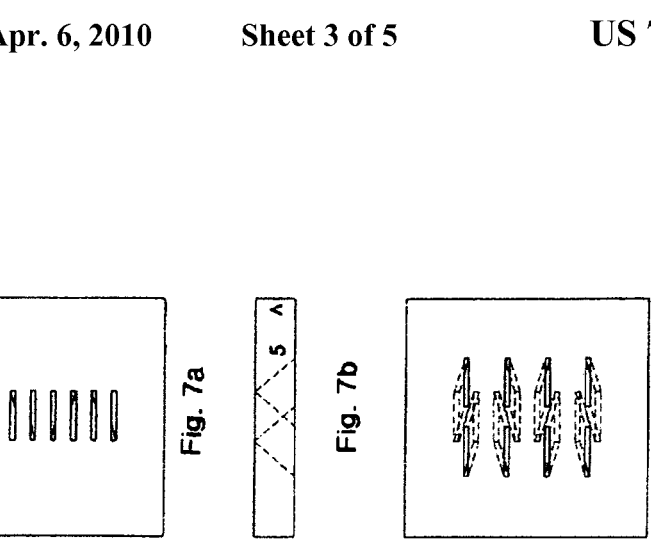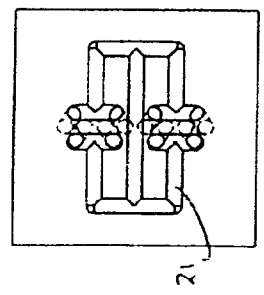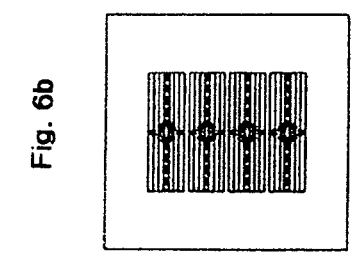

METHOD AND APPARATUS FOR FORMING HIGH STRENGTH PRODUCTS

RELATED APPLICATIONS

This application claims priority from provisional application Ser. No. 60/809,697, filed May 31, 2006.

BACKGROUND

1. Field of the Technology

This application involves the cyclical extrusion of materials to generate nanosized grain features to improve the strength of extruded products.

2. Brief Description of Related Developments

Nanostructured materials are generally regarded as materials having very small grain feature size in the range of 1-100 nanometers ($10^{-9}$ meters). These materials have the potential for wide ranging industrial, biomedical and electronic applications. As a result, a great deal of study is ongoing to gain a better understanding of the characteristics of these materials. Metals, ceramics, polymeric and composite materials may be processed in a variety of ways to form nanosized features. One such method under study is an extrusion process that provides a cyclical compression.

It is a purpose of this application to adapt extrusion technology such as described in U.S. Pat. Nos. 6,533,565 and 6,945,764 to perform a cyclical extrusion of materials by laminating layers of flowing material, multiplying the flow and further laminating and dividing the material flow to generate small grain features and improve strength. It is a further purpose of this application to combine the resulting output flow with a rotating die head, as described in U.S. Pat. Nos. 6,447,279 and 6,669,458 to form a tubular product having very small grain features.

SUMMARY OF THE INVENTION

In one embodiment, a series of dies are arranged to receive a flow of plastic material. A first distribution module divides the flow into multiple capillary streams and distributes the flow downstream to a transition die which further divides the streams and transforms the shape of the generally circular capillary streams into thin ribbon like streams. The number of ribbons formed in the transition die is expanded at a predetermined factor from the output of the distribution die while the flow cross sectional area of each ribbon stream is reduced creating a compression of the flowing material. At the output of the transition die, sets of adjacent ribbons are directed to a first compression stage die that laminates the ribbons of each set into a layered flow, which is a laminate of the sets of adjacent ribbons. The first stage compression die also splits the laminated ribbons into at least a pair of adjacent ribbons. At this stage, the original plastic flow is considerably altered and now comprises at least side by side, multiple parallel flows in the form of laminated ribbons. Each of these flows are subjected to a series of stages in which the divided flows are overlapped to multiply the number of laminations, divided, and overlapped again. In a chain of extrusion stages of this construction, increasing numbers of thin laminations are formed within the extrusion flow. In the case of dual side by side flows the number of laminations, would be doubled at each stage.

By first distributing the flowing plastic into a set of multiple streams and then combining the multiple streams into a series of laminated streams, a group of parallel streams may be processed in parallel and rejoined to generate a laminate plastic flow having a significantly high number of thin laminations in which nano-sized features may be formed. In another embodiment, the rejoined laminated, output plastic flow may be applied to a final die having rotating die elements that wind the laminated plastic flow into a tubular end product having nano-sized features.

A method is presented in this application for generating micro grain features in the range of nanomaterials. A flow of plastic is distributed into multiple capillary shaped streams having volumes predetermined for division into an expanded number of ribbon shaped flows. The capillary streams are divided into thin ribbon shaped streams having a substantially rectangular cross section. Sets of the ribbons are then laminated, one on the other, to form a group of parallel laminated streams. Each of the parallel laminated streams are divided into at least a pair of adjacent streams. The pair of adjacent laminated streams are then overlapped and layered to form a further lamination of the pair of laminated streams, thereby doubling the number of laminations in each of the parallel streams. By subjecting the parallel laminated plastic flows to repeated extrusion steps that divide, overlap and layer, the number of laminations can be multiplied. When the desired number of laminations are achieved to obtain nano-sized grain features, the multiple parallel laminated streams may be rejoined into a single laminated plastic flow. The rejoined flow may be applied to a rotary extrusion die having rotating elements to produce a tubular end product.

In this manner the number of extrusion stages required to obtain nano-sized features are reduced and the length of the extrusion devise substantially shortened.

BRIEF DESCRIPTION OF THE DRAWINGS

An extrusion system and method of extrusion is explained in more detail below with reference to the accompanying drawing, in which:

FIG. 1 is a transparent perspective view of an embodiment of the extrusion system of this application showing a schematic illustration of the flow through the system:

FIG. 2 is a top view of the extrusion system of FIG. 1;

FIGS. 3a, b, and c are respectively a upstream face view, a top view, and a downstream face view of the extrusion plate 1 of the extrusion system of FIG. 1;

FIGS. 4a, b, and c are respectively a upstream face view, a top view, and a downstream face view of the extrusion plate 2 of the extrusion system of FIG. 1;

FIGS. 5a, b, and c are respectively a upstream face view, a top view, and a downstream face view of the extrusion plate 3 of the extrusion system of FIG. 1;

FIGS. 6a, b, and c are respectively a upstream face view, a top view, and a downstream face view of the extrusion plate 4 of the extrusion system of FIG. 1;

FIGS. 7a, b, and c are respectively a upstream face view, a top view, and a downstream face view of the extrusion plate 5 of the extrusion system of FIG. 1;

DESCRIPTION OF THE PREFERRED EMBODIMENT

Figure 11A:
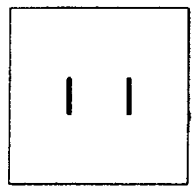
FIGS. 11a, b, and c are respectively a upstream face view, a top view, and a downstream face view of the extrusion plate 9 of the extrusion system of FIG. 1.
Figure 11B:
Figure 11C:
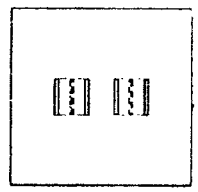
Figure 10A:
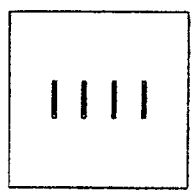
FIGS. 10a, b, and c are respectively a upstream face view, a top view, and a downstream face view of the extrusion plate 8 of the extrusion system of FIG. 1.
Figure 10B:
Figure 10C:
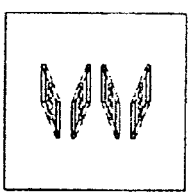
Figure 9A:
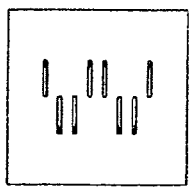
FIGS. 9a, b, and c are respectively a upstream face view, a top view, and a downstream face view of the extrusion plate 7 of the extrusion system of FIG. 1.
Figure 9B:
Figure 9C:
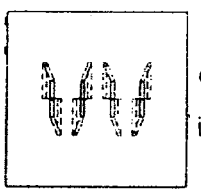
Figure 13A:
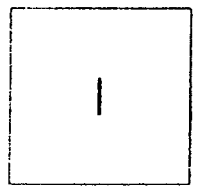
FIGS. 13a, b, and c are respectively a upstream face view, a top view, and a downstream face view of the extrusion plate 11 of the extrusion system of FIG. 1.
Figure 13B:
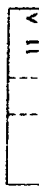
Figure 13C:
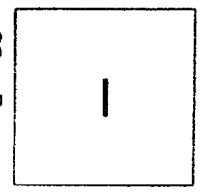

An embodiment of an extrusion system 100, incorporating features of the present invention is illustrated in the figures. Although the present invention will be described with reference to the embodiments shown in the drawings, it should be understood that the present invention may have many alternate forms.

As shown in FIG. 1, extrusion system 100 is constructed with a series of die plates 1-11 arranged to receive and process a flow of plastic material 101 in the direction shown by arrow 107. Like plates 7 and 8 are shown repeated. A first distribution module 110, consisting of plates 1 and 2, serves to receive the flow 101 from a source (not shown) and divide the flow 101 into multiple capillary streams at the output of plate 2. According to the embodiment shown, in particular plate 2, as shown in FIGS. 4a, b, and c, a series of distribution grooves 21 receive the flow 101 and spread the flow in a balanced manner into an array of eight capillary passages 22.

It should be noted at the beginning, that it is a purpose of this arrangement of die plates to convert the input flow 101 into a group of parallel laminated flows 102-105, as shown in FIG. 1. The number of flow streams and groups formed may depend on a variety of factors and this application is not intended to be limited to the number of flow streams and groups shown, however multiple parallel flows are needed to reduce the overall length of the extrusion system.

A transition stage 111, see FIG. 2, is constructed of plates 3-5 to form a group of laminated streams. Transition plate 3 receives the flow from the eight capillary passages. Transition plate 3, as shown in FIG. 5a-5c, is constructed to divide the streams and transform the shape of the generally circular capillary streams into thin ribbon like streams, as shown in FIG. 1. The number of ribbon streams formed in the transition plate 3 is expanded at a predetermined factor, for example doubled to sixteen as shown, while the cross sectional flow area of each ribbon stream is reduced. According to the embodiment shown in FIGS. 5a, b, and c, the ribbons are in a vertically dispersed array at the outlet of plate 3. At the output of the transition plate 3, sets of horizontally adjacent ribbon flows are directed to a second transition plate 4 that laminates the ribbons of each set into a layered flow that is a laminate of the sets of adjacent ribbons. As shown in FIG. 1, the sixteen ribbon flows are consolidated into four laminated flows 102-105 at die plate 6.

The second transition plate 4 also splits the laminated ribbons into a pair of side by side adjacent ribbons, for example, as shown at 105a and 105b in FIGS. 1 and 2, that are dispersed horizontally in the illustrated embodiment. It may be advantageous in certain applications to divide the streams further. In third transition plate 5, the side by side streams are overlapped and formed into an output of eight streams which are directed downstream to plate 6 in which the streams are extruded into four laminated streams 102-105.

At the stage represented by the output of plate 6, the original plastic flow 101 is considerably altered and now comprises a group of four laminated streams 102, 103, 104, and 105, that flow in parallel, distributed vertically as shown in FIG. 1. Laminated streams 102-105 may then be divided into at least side by side pairs of flow streams 102a and b through 105a and b. For simplicity of illustration, only flow streams 105a and b are shown. The flow streams of each group are in the form of laminated ribbons and retain a layered structure according to the number of laminations. This structure is maintained throughout the extrusion process except for increased numbers of thinner and thinner layers.

Figure 8A:
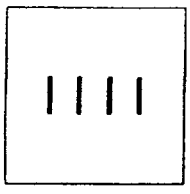
FIGS. 8a, b, and c are respectively a upstream face view, a top view, and a downstream face view of the extrusion plate 6 of the extrusion system of FIG. 1.
Figure 8B:
Figure 8C:
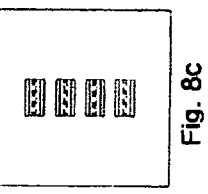
Figure 12A:
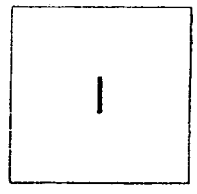
FIGS. 12a, b, and c are respectively a upstream face view, a top view, and a downstream face view of the extrusion plate 10 of the extrusion system of FIG. 1.
Figure 12B:
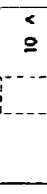
Figure 12C:
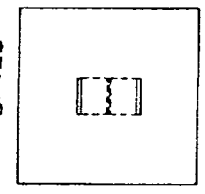

Each flow of the group may then be subjected to a series of laminating stages to multiply the number of laminations in each stream. At each laminating stage the flow streams are compressed, thereby creating a cyclical compression of the flow streams in a parallel arrangement. The laminations are further provided by a combination of plates 7 and 8 as shown in FIGS. 8a, b, and c through 10a, b, and c, in which the flows are divided and overlapped to multiply the number of laminations. The flow may be divided, and overlapped again, in a chain of extrusion stages of this construction, thereby forming increasing numbers of gradually thinner laminations within the extrusion flow until nano features are formed.

In the case of dual side by side flows, such as 105a and 105b, the number of laminations, would be doubled at each stage. Considering the number of laminating stages shown in FIGS. 1 and 2, the number of laminations may be amplified from 4 at plate 4 to 512 at plate 10. By first distributing the flowing plastic into a set of multiple streams and then combining the multiple streams into a series of laminated streams, a group of parallel streams may be processed in parallel and rejoined sequentially in plates 11-13, to generate a plastic flow having a significantly high number of thin laminations, for example 512×4 at plate 11. The laminations are progressively more thin eventually forming the desired nano-sized features.

As shown in FIG. 1 the group of four parallel flows laminated to form nano-sized features are then combined to form a single output flow 106. In a further extrusion step, the output 106 is passed to a rotary extrusion die 200 having rotating components of the type described in U.S. Pat. Nos. 6,447,279 and 6,669,458 the disclosures of which are incorporated herein by reference. The output flow 106 is wound into tubular form by the rotating die elements of rotating extrusion die 200. In this manner a tubular end product is formed having nano-sized features.

Figure 14:
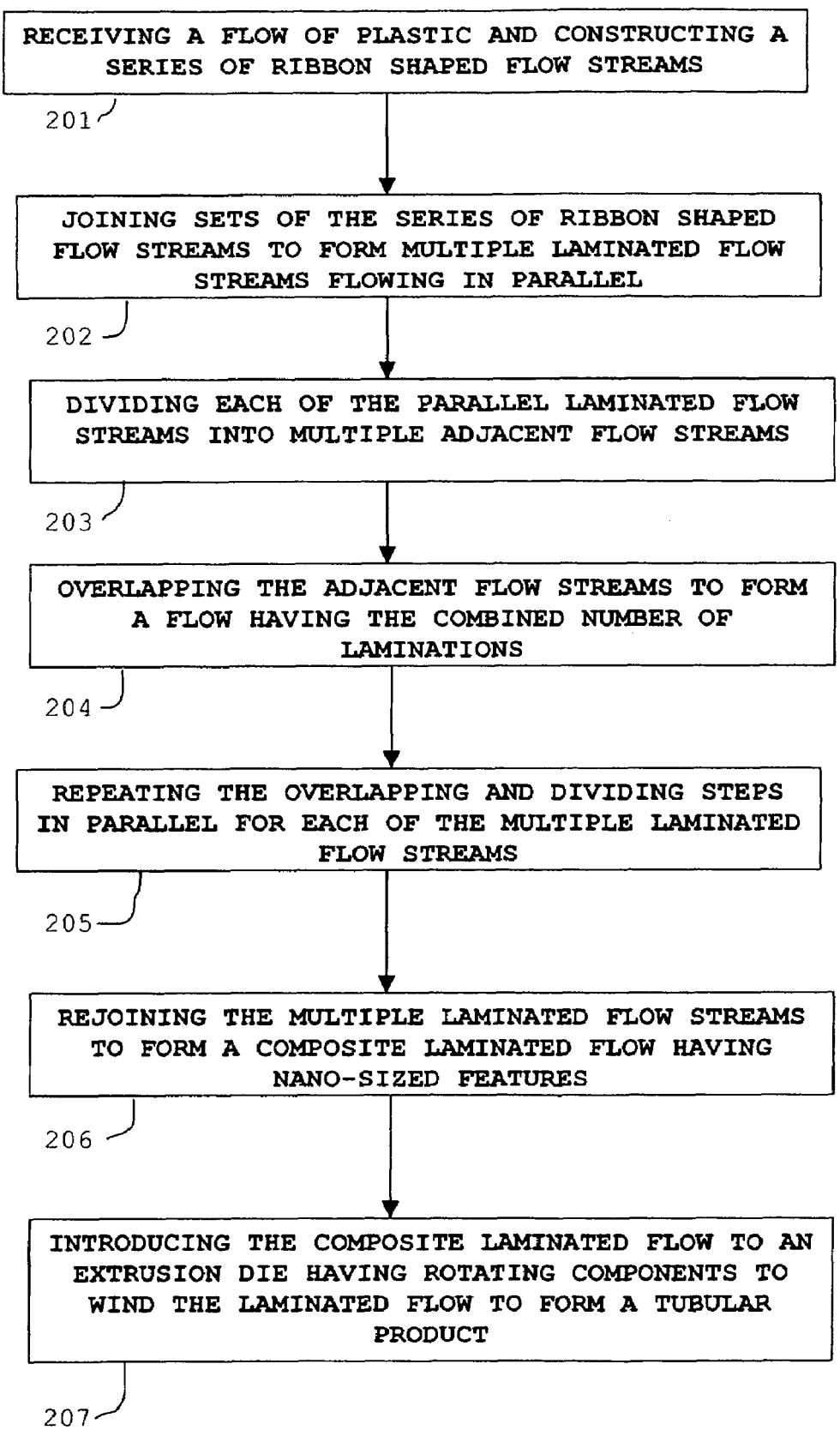
FIG. 14 is flow chart showing the method of this application.

As shown in FIG. 14, a method is presented in this application for generating micro grain features in the range of nano-sized materials. Plastic flow 101, is distributed into multiple capillary shaped streams having volumes predetermined for division into an expanded number of ribbon shaped flows at 201. The capillary streams are divided into thin ribbon shaped streams having a substantially rectangular cross section. At 202, sets of the ribbons are then layered, one on the other, to form a group of parallel laminated streams, for example streams 102-105 shown in FIGS. 1 and 2. Each of the parallel laminated streams are divided, at 203, into at least a pair of adjacent streams, for example, 105a and 105b in FIG. 2.

The pair of adjacent laminated streams are then overlapped and layered to form a further lamination of the pair of laminated streams at 204, thereby doubling the number of laminations in each of the parallel streams. By subjecting the parallel laminated plastic flows to repeated extrusion steps that divide, overlap and layer, the number of laminations can be multiplied, at 205. At each sequence of dividing, overlapping and layering the flow streams are subjected to repeated compression cycles.

As shown in FIG. 2, dividing into dual adjacent streams amplifies the laminations from 8 to 512 in 6 steps. When the desired number of laminations are achieved to obtain nano-sized grain features, the multiple parallel laminated streams may be rejoined into a single laminated plastic flow at 206. The rejoined flow may be applied to a rotary extrusion die having rotating elements to produce a tubular end product. In alternate embodiments, the laminated nano-structured, flow stream 206 may be applied to a wide variety of extrusion devices depending on the shape and application to which the system is adapted.

In this manner the number of extrusion stages required to obtain nano-sized features are reduced and the length of the extrusion devise substantially shortened.

It should be understood that the above description is only illustrative of the invention. Various alternatives and modifications can be devised by those skilled in the art with out departing from the invention. Accordingly, the present invention is intended to embrace all such alternatives, modifications and variances which fall with the scope of the appended claims.

We claim:

1. A method of extruding materials using various stages in a nano-scale extrusion system, having nano-sized features, comprising: receiving a flow of extrudible material in an extrusion system and constructing a series of ribbon shaped flow streams; subjecting the ribbon shaped flow streams to multiple sequences of stages, wherein, in each of said sequences the flow streams are compressed, said sequences further comprising: joining sets of the series of ribbon shaped flow streams to form multiple laminated flow streams flowing in parallel; dividing each of the multiple parallel laminated flow streams into at least two adjacent flow streams, while compressing the resulting flow streams to form thinner laminations; overlapping the adjacent flow streams to form a flow stream, thereby multiplying the number of laminations; repeating the dividing and overlapping steps in parallel for each of the multiple parallel laminated flow streams to multiply the number of laminations and to generate progressively thinner laminations until nano-sized features are obtained.

2. The method according to claim 1 wherein the multiple laminated flow streams are combined to form a single output laminated flow stream having nano-sized features.

3. The method according to claim 2 wherein the laminated flow stream having nano-sized features is introduced to an extrusion die having rotating components to wind the laminated flow to form a tubular product.

4. The method according to claim 1 wherein the received flow of extrudible material is first divided into multiple balanced capillary flow streams.

5. An extrusion system comprising:
a first stage of die plates constructed to receive a flow of extrudible material and divide said flow into multiple ribbon shaped flow streams;
a second stage of die plates constructed to receive the multiple ribbon shaped flow streams and further divide each of said multiple ribbon shaped flow streams into at least two ribbon shaped flow streams and further said second stage of die plates constructed to layer said at least two ribbon shaped flow streams into composite laminated flow streams; and
a third stage of die plates constructed to receive the composite laminated flow streams and to again divide each of said composite laminated flow streams into at least two ribbon shaped flow streams and further said third stage of die plates constructed to layer said at least two ribbon shaped flow streams into composite laminated flow streams, wherein the number of laminations is multiplied and compressed.

6. The extrusion system of claim 5, wherein the multiple flow streams from the first stage of die plates are displaced in a stack to create multiple flow streams flowing in parallel.

7. The extrusion system of claim 6, wherein the divided flow streams of the second and third stages of die plates are displaced transversely to the stack to create side by side flow streams for layering into laminations.

8. The extrusion system of claim 5, further comprising a distribution stage of die plates constructed upstream of the first stage, said die plates in said distribution stage constructed to receive the flow of extrudible material and divide said flow of extrudible material into a balanced flow of capillary flow streams for delivery to said first stage of die plates.

9. An extrusion system comprising:
a distribution die module constructed to receive a flow of extrudible material and divide said flow into multiple capillary streams at a downstream outlet of the distribution die module;
a first transition die module constructed to receive the multiple capillary streams from the distribution die module and transform the capillary streams into multiple ribbon shaped streams, expanded in number by a predetermined factor and reduced in cross sectional flow area, at the outlet of the first transition die module;
a second transition die module constructed to receive the multiple ribbon streams from the first transition die module, to layer said multiple ribbon streams into one or more laminated streams, and to divide each of the multiple laminated ribbon streams into at least two sets of multiple ribbon streams at the outlet of the second transition die module;
a third transition die module constructed to receive the at least two sets of multiple laminated ribbon streams from the second transition die module and to further layer the multiple laminated ribbon streams to increase the number of laminations of each ribbon stream and to combine said further layered laminated ribbon streams into a reduced number of laminated streams at the output of the third transition die module;
a final die module constructed to receive the reduced number of multiple laminated streams from the third transition module and to subject said multiple laminated streams to further dividing and layering to multiply the number of laminations in each of the multiple laminated ribbon streams to form multiple laminated ribbon streams having a laminated structure with increasing numbers of thinner and thinner laminations to form an extruded material having nano-sized features.

10. The extrusion system of claim 9 wherein the distribution die module includes a first distribution die having multiple distribution grooves to provide a balanced flow into multiple capillary outlets.

11. The extrusion system of claim 9 wherein the outlet of the first transition die module is constructed having a substantially rectangular cross section to convert the capillary flow to a ribbon flow.

12. The extrusion system of claim 9 wherein the distribution die module, the first, second and third transition die modules and the final die modules are arranged to process the flow of extrudible material in parallel flow streams.

13. The extrusion system of claim 9 further comprising an output die module that combines the multiple laminated ribbon streams into a single output laminated stream having nano-sized features.

* * * * *

UNITED STATES PATENT AND TRADEMARK OFFICE
CERTIFICATE OF CORRECTION

PATENT NO. : 7,690,908 B2  Page 1 of 1
APPLICATION NO. : 12/082345
DATED : April 6, 2010
INVENTOR(S) : Richard Guillemette It is certified that error appears in the above-identified patent and that said Letters Patent is hereby corrected as shown below:

In the Claims:

Column 5, line 28, in Claim 1, before "stages" insert --laminating--.

Signed and Sealed this

Seventeenth Day of August, 2010

David J. Kappos
*Director of the United States Patent and Trademark Office*